(No Model.)
J. W. SIMONS.
THREAD AND CLOTH CUTTING IMPLEMENT.
No. 584,526. Patented June 15, 1897.
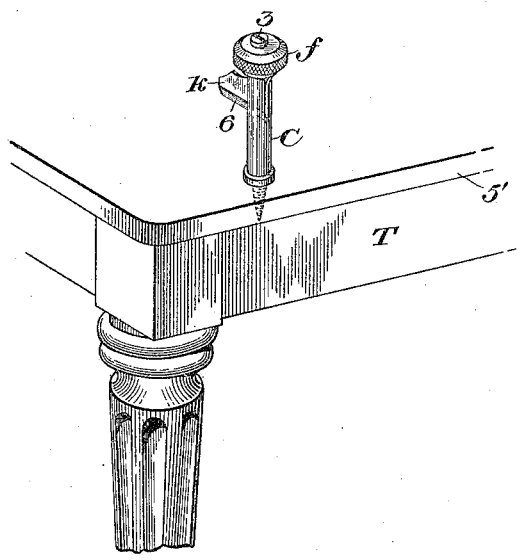
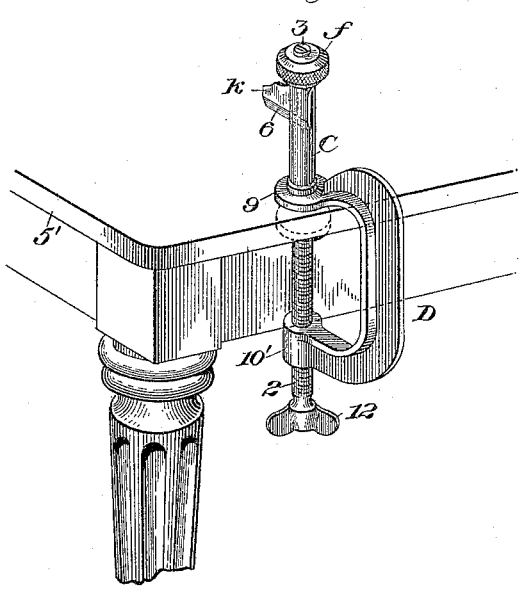
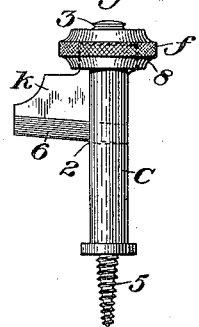
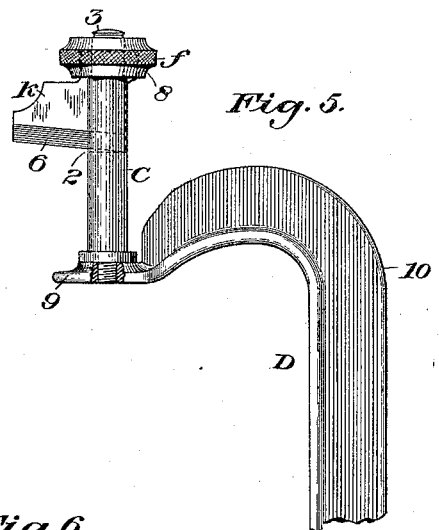
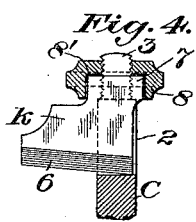
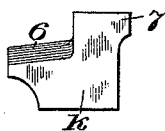
Witnesses:
C. W. Smith
Fred. J. Dole
Inventor,
James W. Simons
By his Attorney,
F. A. Richards

UNITED STATES PATENT OFFICE.

JAMES W. SIMONS, OF PORT CHESTER, NEW YORK.

THREAD AND CLOTH CUTTING IMPLEMENT.

SPECIFICATION forming part of Letters Patent No. 584,526, dated June 15, 1897.

Application filed October 26, 1896. Serial No. 610,026. (No model.)

*To all whom it may concern:*

Be it known that I, JAMES W. SIMONS, a citizen of the United States, residing in Port Chester, in the county of Westchester and State of New York, have invented certain new and useful Improvements in Thread and Cloth Cutting Implements, of which the following is a specification.

This invention relates to cutting implements of that class generally known as "twine" or "cloth" cutting implements; and the object of my invention is to provide a simple and efficient cutting implement of improved construction and organization especially adapted to be used for slitting the edges of pieces of fabric to thereby facilitate the ripping of the fabric in the line of the weft from selvage to selvage and to embody in such instrument means whereby the same may be readily set at different points along a counter or table and be firmly attached to said counter or table in proper position to be employed as a gage in measuring the fabric, as well as a cutting implement for slitting the edge of said fabric, thus facilitating the operations of measuring and slitting the fabric preparatory to ripping the same along the weft.

In factories or mills where quantities of fabric are cut to predetermined lengths and made up into articles—such, for instance, as pillow-cases, &c.—it has been customary to place the piece or bolt of cloth upon the table, measure it lengthwise of the warp, and cut the same along the weft from selvage to selvage by a pair of shears. This method of cutting off predetermined lengths of fabric is objectionable not only on account of its tediousness through the length of time required in cutting the strips, but it is further objectionable for the reason that in cutting the strip by the shearing process it is almost impossible to make the cut in parallelism with the weft-strands of the fabric, and in consequence the fabric will not tear in parallelism with the weft, and a ragged edge also results from the severing of successive weft-strands, and this precludes the possibility of turning over and hemming the piece without unnecessary waste of material for the reason that the edge of the piece will assume a diagonal position at the fold, thereby forming an unsightly hem; and it is the chief object of this invention to provide means for overcoming these objections.

In the drawings accompanying and forming part of this specification, Figure 1 is a perspective view of the improved cutting implement applied to a table in position for use, said figure showing the cutting implement secured by means of a screw to the table-top. Fig. 2 is a similar view of the cutting implement in the preferred form thereof and embodying means whereby the same is movably and adjustably clamped to the top board of the table. Fig. 3 is a side view of the cutting implement in the form thereof shown in Fig. 1. Fig. 4 is a sectional view of a portion of the upper end of the cutting implement. Fig. 5 is a side view, partially in section, of the cutting implement *per se* and a portion of the clamp shown in Fig. 2. Fig. 6 is a side view of a slightly-modified form of cutting-blade which may be employed in connection with either of the forms of implement shown in Figs. 1 or 2.

Similar characters designate like parts in all the figures of the drawings.

My improved cutting implement, in the preferred form thereof shown in Figs. 2 and 5 of the drawings, comprises an elongated cutting-blade carrier having opposite screw-threaded ends and having a transverse cutting-blade-receiving slot formed therethrough intermediate said screw-threaded ends, a cutting-blade removably seated in said slot with its cutting edge intersecting the longitudinal axis of the blade-carrier, a blade-holding device removably screwed to one screw-threaded end of said carrier, and a clamp removably secured to the opposite screw-threaded end of said carrier.

In Fig. 2 of the drawings the cutting implement, in the preferred organization thereof, is shown removably clamped to a table, whereas in Fig. 1 the clamp is dispensed with and the cutting-blade carrier, which constitutes an element of the cutting implement, is shown having its screw-threaded lower end screwed into the upper face of the table, as hereinafter described.

The cutting-tool carrier, which is designated in a general way by C, is shown in the drawings in the nature of a cylindrical post transversely slotted near the upper end thereof, as shown at 2, to form a seat for the cutter-blade or knife, and said post is shown furnished at one end thereof with a diametrically-reduced externally-screw-threaded portion 3 to receive a binding-nut $f$, which constitutes the fastening device for the cutter-blade, and said post is also shown furnished at the opposite end thereof with a screw or diametrically-reduced screw-threaded portion 5, by means of which the post may be removably secured to the ledge 5' of a table T, as shown in Fig. 1, or may be removably secured to a table-clamping device, (designated in a general way by D,) as shown in Figs. 2 and 5.

The cutting-blade or knife, which is designated in a general way by $k$, consists, in the preferred form thereof, (shown in Figs. 2 to 5, inclusive,) of a thin strip of metal beveled at the lower edge thereof, as shown at 6, to form the cutting edge and having at the upper edge thereof a relatively narrow extension 7, which, when the blade is seated in the slot 2 of the carrier C, extends slightly beyond the opposite side faces of said carrier and in position to be engaged by the inner wall of a depending flange 8 of the fastening nut or device $f$, as will be readily understood by reference to Fig. 4 of the drawings.

In Figs. 1 to 4 of the drawings the cutting-blade is shown with the cutting edge located on the under side thereof, whereas in Fig. 6 the cutting edge is shown located on that side of the blade nearest the extension 7, and it will be obvious that either form of cutting-blade shown in the drawings may be employed without departure from this invention.

For the purpose of securing the cutting-blade in the carrier C and holding the same against accidental movement the fastening device $f$, which is shown in the nature of a nut tapped to fit the screw-threaded end 3 of the carrier, is counterbored on the under side to form an end bearing 8' and a flange 8, adapted for coacting with opposite side faces, respectively, of the extension 7 of the cutter-blade to hold the same against movement transversely of the carrier.

In Fig. 5 the screw 5 of the cutter-blade carrier is shown seated in a screw-threaded bearing formed in the plate 9 of the frame 10 of a clamping device D, which in this instance constitutes the device for securing the cutting-tool to the counter or table. This clamping device (shown in Figs. 2 and 5) is of the ordinary screw-clamp type, comprising the usual arched frame 10, having a bearing-plate 9, a clamp-screw bearing 10', and a clamp-screw 12.

In some cases it is preferable to provide means for clamping the cutting implement to the table, as shown in Fig. 2, instead of screwing the same thereon, as shown in Fig. 1, and for that reason I have provided a clamping device and have constructed the blade-carrier of the cutting implement with means whereby the same may be readily attached to the clamping device or may be removed and independently attached to the table; and it will be understood that I do not desire to limit myself to either of the specific forms of cutting implement shown in Figs. 1 and 2, respectively, of the drawings, as any reasonable modification thereof is within the scope and limits of my invention.

In Figs. 1, 2, and 4 of the drawings the cutter-blade carrier is shown bifurcated or slotted from the extreme upper screw-threaded end thereof longitudinally to receive the cutting-blade $k$, but it will be obvious that this slot need not extend to the extreme end of said carrier. In practice, however, it is preferable to slot the carrier from the extreme outer ends inward to provide resilient walls which, when the nut $f$ is applied thereto, will impinge between them the cutter, thus providing additional security against vibration.

From the foregoing description it will be seen that the implement in its entirety, as illustrated in Fig. 2, may be removably attached to the ledge of a table or counter by means of the clamping device D thereof, or that the cutter-blade carrier C may be removed from said clamping device and be screwed into the top of the table or counter to be used independent of said clamping device.

Having described my invention, I claim—

1. In a cutting implement the combination, of a cutting-blade carrier having screw-threaded ends in axial alinement with that portion of said carrier intermediate said ends and having a blade-receiving slot intermediate the screw-threaded ends of said carrier; and a cutting-blade removably seated in said slot with its cutting edge intersecting the longitudinal axis of said carrier.

2. In a cutting implement of the class specified the combination, of an elongated cutting-blade carrier having opposite screw-threaded ends and having a transverse cutting-blade-receiving slot formed therethrough intermediate the screw-threaded ends thereof; a cutting-blade removably seated in said slot with its cutting edge intersecting the longitudinal axis of said carrier; and a blade-holding device removably secured to one screw-threaded end of the carrier and engaging the cutting-blade.

3. In a cutting implement of the class specified the combination, of a cutting-blade carrier slotted transversely at one end thereof to receive a cutting-blade and having screw-threaded extensions at opposite ends, respectively, thereof, one of which constitutes an attaching device and the other of which is adapted for receiving a binding-nut; a cutting-blade removably seated in the slotted portion of the carrier, with its cutting edge intersecting the longitudinal axis of said carrier; and a binding-nut engaging one threaded end of said carrier and normally engaging the cutting-blade, for holding said blade against movement transverse of the carrier.

4. In a cutting implement of the class specified, a cylindrical cutting-blade carrier having diametrically-reduced screw-threaded extensions at opposite ends, respectively thereof, located in alinement with the longitudinal axis of the carrier and having a transverse slot intermediate said extensions; combined with a cutting-blade seated in the slotted portion of the carrier, with its cutting edge intersecting the longitudinal axis of said carrier and having an extension at the upper edge thereof which projects laterally beyond the side faces of the carrier; and a nut adjustably carried by the screw-thread extension of the carrier adjacent to the cutting-blade and having a concentrically-disposed flange normally surrounding the extension of the cutting-blade and holding said cutting-blade against movement.

5. In a cutting implement the combination, of an elongated cutting-blade carrier having diametrically-reduced screw-threaded opposite ends in axial alinement with the axis of that portion of said carrier intermediate said ends and having a transverse blade-receiving slot intermediate said screw-threaded ends; a cutting-blade removably seated in said slot with its cutting edge intersecting the longitudinal axis of said carrier; and a clamping device carried by the opposite screw-threaded end of said carrier and embodying means whereby the implement may be removably and adjustably fixed to a counter.

6. In a cutting implement of the class specified the combination, of a clamp having a projecting arm with a screw-threaded bearing formed therein; a cutting-blade carrier having a screw at one end thereof adjustably seated in the screw-threaded bearing of the clamp-arm; a cutting-blade removably supported on, and having its cutting edge intersecting the longitudinal axis of, said carrier; and a fastening device adjustably carried by said carrier and normally engaging the cutting-blade to hold the same against movement.

7. In a cutting implement, the combination of a cutting-blade carrier slotted and externally screw-threaded at one end thereof to form resilient arms; a cutting-blade supported between such resilient arms and having an extension at the upper edge thereof which projects normally beyond the side faces of the carrier; a nut adjustably carried on the resilient arms of the carrier and having a depending flange for engaging the extension of the cutting-blade and adapted for impinging the arms against said cutting-blade to hold the same in place; and means located at the opposite end of said carrier for attaching the same to a table.

JAMES W. SIMONS.

Witnesses:
WALTER L. BURNS,
JOHN C. HALPIN.